United States Patent
Mitsumoto (10) Patent No.: US 7,185,808 B2
(45) Date of Patent: Mar. 6, 2007

(54) ENTERING/LEAVING MANAGEMENT SYSTEM

(75) Inventor: Hiroki Mitsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/317,009

(22) Filed: Dec. 27, 2005

(65) Prior Publication Data

US 2006/0131400 A1     Jun. 22, 2006

Related U.S. Application Data

(63) Continuation of application No. PCT/JP2003/010636, filed on Aug. 22, 2003.

(51) Int. Cl.
*G06K 5/00*     (2006.01)

(52) U.S. Cl. .................. 235/382.5; 235/375; 340/5.25; 340/5.6

(58) Field of Classification Search ................ 235/375, 235/382, 382.5; 340/5.2, 5.25, 5.6, 5.65, 340/5.66

See application file for complete search history.

(56) References Cited

U.S. PATENT DOCUMENTS

| | | | | |
|---|---|---|---|---|
| 4,822,990 A | * | 4/1989 | Tamada et al. | 235/492 |
| 5,204,663 A | * | 4/1993 | Lee | 340/5.28 |
| 5,471,203 A | * | 11/1995 | Sasaki et al. | 340/5.3 |
| 5,541,585 A | * | 7/1996 | Duhame et al. | 340/5.62 |
| 5,831,533 A | * | 11/1998 | Kanno | 340/5.64 |
| 6,965,294 B1 | * | 11/2005 | Elliott et al. | 340/5.2 |
| 7,123,126 B2 | * | 10/2006 | Tanaka et al. | 340/5.2 |
| 2005/0185600 A1 | * | 8/2005 | Nicholls | 370/260 |

FOREIGN PATENT DOCUMENTS

JP     7-262278     10/1995

* cited by examiner

*Primary Examiner*—Michael G. Lee
*Assistant Examiner*—Daniel A. Hess
(74) *Attorney, Agent, or Firm*—Staas & Halsey LLP (57) ABSTRACT

An entering/leaving management system includes a mobile terminal and a managing server. The mobile terminal and a room IC card are carried to a room when using the room, and a start key of the mobile terminal is depressed, so that an IC card reading unit reads room identifier information from the room IC card. The mobile terminal adds time information acquired by a time management unit and the room identifier information to user identifier information read from a user IC card, so that the resulting information is stored into an information storage unit as entering/leaving managing information. After reading of all user IC cards is completed, the mobile terminal transmits the entering/leaving managing information to the managing server by using an information transmitting unit, so that the entering/leaving managing information is stored in the managing server.

8 Claims, 11 Drawing Sheets

ENTERING/LEAVING MANAGEMENT SYSTEM

CROSS-REFERENCE TO RELATED APPLICATION

This application is a U.S. continuation application which is filed under 35 USC 111(a) and claims the benefit under 35 USC 120 and 365(c) of International Application No. PCT/JP2003/010636, filed on Aug. 22, 2003, the entire contents of which are hereby incorporated by reference.

BACKGROUND OF THE INVENTION

1. Field of the Invention

The present invention relates to an entering/leaving management system which uses an IC card and is applicable to attendance/absence management systems in universities, company offices, etc.

2. Description of the Related Art

In recent years, an entering/leaving management system using an IC card is put in practical use with the increasing demand for security of confidential information in companies.

In the currently used entering/leaving management system, an IC card and an IC card reader are utilized. In the IC card, the user identifier (ID) information that identifies the user who owns the IC card is recorded. The IC card reader is built into an electric lock controlling mechanism, and the electric lock controlling mechanism is installed near a door of a room which is locked with an electric lock.

The above-mentioned entering/leaving management system reads the user ID information from the IC card using the IC card reader. The entering/leaving management system is constructed so that the allowability of unlocking of the electric lock is determined by making reference to the entering/leaving authority information for every user identifier (ID) information stored in the IC card reader (or in a host device connected with the IC card reader via a network).

The user ID information read from the IC card is stored into or managed as a database together with the information on the time the user ID information is read, and the information on the operated IC card reader, etc. By using the entering/leaving management system mentioned above, it is possible to manage the information of the IC card holder as to when the IC card holder enters the room concerned and what room the IC card holder enters or leaves.

A certain company has attempted for an improvement to change the conventional attending/leaving management system in which the user ID information is read from a magnetic card using a time recorder into the conventional entering/leaving management system in which an IC card is used as described above.

This attending/leaving management system can be considered as a kind of the entering/leaving management system.

However, the above-mentioned attending/leaving management system differs from the above-mentioned entering/leaving management system in that the above-mentioned attending/leaving management system does not manage the information of authority of entering/leaving the room for every individual user.

The above-mentioned attending/leaving management system manages only the information on when the IC card holder has operated the time recorder (that is, as to when the user attends the office and leaves the office). Strictly speaking, this system differs from the above-mentioned entering/leaving management system.

In order to introduce the conventional entering/leaving management system, it is necessary to carry out the installation work for installing the electric lock and the IC card reader with the electric lock control function being incorporated for every door of the room concerned. In some cases, the installation work for network facilities which connect the entering/leaving management system with the host device via the network is also needed.

Accordingly, there is a problem that introducing the conventional entering/leaving management system requires a large amount of installation cost and investment for the existing building, and introducing the entering/leaving management system cannot be performed easily with low cost.

A conceivable method of simplifying the entering/leaving management system may be to install a time recorder for use with the attending/leaving management system. However, it is also necessary for this method to install a time recorder for each of the rooms concerned. Introduction of the entering/leaving management system of this method cannot be easily performed with low cost.

SUMMARY OF THE INVENTION

An object of the present invention is to provide an improved entering/leaving management system in which the above-described problems are eliminated.

Another object of the present invention is to provide an entering/leaving management system which can be easily introduced in the existing office environment or the like with low cost when compared with the case of the conventional entering/leaving management system or the conventional attending/leaving management system.

In order to achieve the above-mentioned objects, the present invention provides an entering/leaving management system including a user IC card on which user identifier information to identify a specific user is recorded, a room IC card on which room identifier information to identify a specific room is recorded, a mobile terminal provided to access the user IC card and the room IC card, and a managing server, the mobile terminal comprising: a time management unit provided to acquire a current time; an IC card reading unit reading the user identifier information from the user IC card and reading the room identifier information from the room IC card; an information storage unit provided to store the user identifier information read from the user IC card together with additional information as entering/leaving managing information; and an information transmitting unit transmitting the entering/leaving managing information stored in the information storage unit, to the managing server, wherein an administrator carries the mobile terminal and the room IC card to the room when using the room, and depresses a start key of the mobile terminal, so that the IC card reading unit reads the room identifier information from the room IC card, wherein the mobile terminal adds the time information acquired by the time management unit and the room identifier information to the user identifier information read from the user IC card by the IC card reading unit, so that the resulting information is stored into the information storage unit as the entering/leaving managing information, wherein, after reading of all user IC cards is completed, the mobile terminal transmits the entering/leaving managing information stored in the information storage unit, to the managing server by using the information transmitting unit, and the entering/leaving managing information is stored in the managing server, and wherein the managing server manages times of arrival and departure of the user through cross reference of the stored entering/leaving managing information with user basic information and room basic information.

In order to achieve the above-mentioned objects, the present invention provides an entering/leaving management system including a user IC card on which user identifier information to identify a specific user is recorded, an operator IC card on which operator identifier information to identify a specific operator is recorded, a mobile terminal provided to access the user IC card and the operator IC card, and a managing server, the mobile terminal comprising: a time management unit provided to acquire a current time; an IC card reading unit reading the user identifier information from the user IC card and reading the operator identifier information from the operator IC card; an information storage unit provided to store the user identifier information read from the user IC card together with additional information as entering/leaving managing information; and an information transmitting unit transmitting the entering/leaving managing information stored in the information storage unit, to the managing server, wherein an operator carries the mobile terminal and the operator IC card to the room when using the room, and depresses a start key of the mobile terminal, so that the IC card reading unit reads the operator identifier information from the operator IC card, wherein the mobile terminal adds the time information acquired by the time management unit and the operator identifier information to the user identifier information read from the user IC card by the IC card reading unit, so that the resulting information is stored into the information storage unit as the entering/leaving managing information, wherein, after reading of all user IC cards is completed, the mobile terminal transmits the entering/leaving managing information stored in the information storage unit, to the managing server by using the information transmitting unit, and the entering/leaving managing information is stored in the managing server, and wherein the managing server manages times of arrival and departure of the user through cross reference of the stored entering/leaving managing information with user basic information and operator basic information.

According to the entering/leaving management system of the present invention, a special installation work for installing the entering/leaving management system is no longer necessary, and it is possible to introduce easily the entering/leaving management system with low cost when compared with the case of the conventional system.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of an embodiment of the invention with reference to the accompanying drawings.

Figure 1:
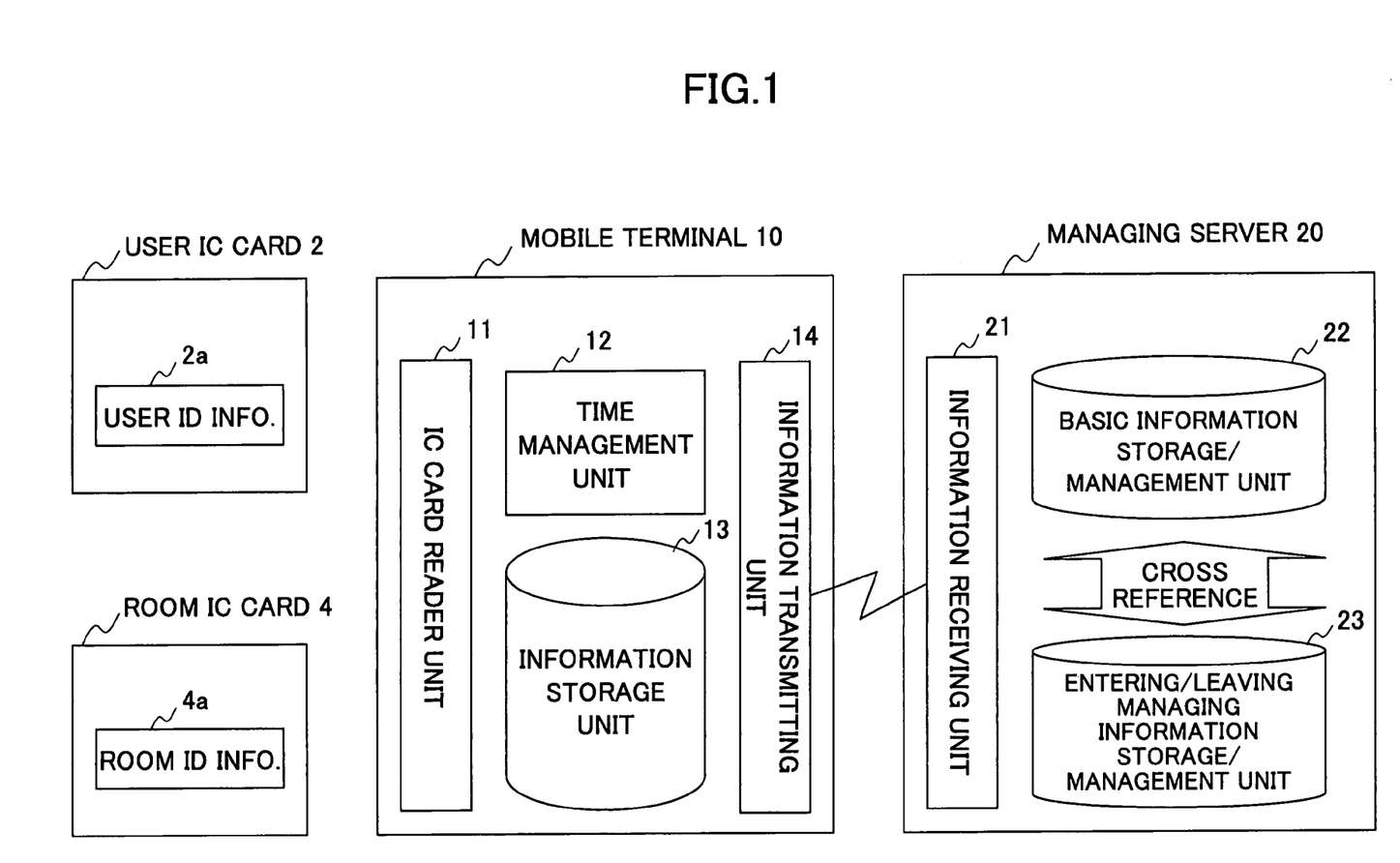
FIG. 1 is a block diagram showing the composition of an entering/leaving management system in an embodiment of the invention.

FIG. 1 shows the composition of an entering/leaving management system in an embodiment of this invention.

As shown in FIG. 1, the entering/leaving management system of this embodiment comprises a user IC card 2, a room IC card 4, a mobile terminal 10, and a managing server 20.

The user IC card 2 is an IC card on which user identifier (ID) information 2a that identifies each individual who is a user (a student, an employee, etc.) is recorded. The user IC card 2 is usually carried by the user (or each individual).

The room IC card 4 is an IC card on which room identifier (ID) information 4a that identifies individual room (a classroom, a conference room, etc.) is recorded. The room IC card 4 is prepared beforehand through the batch processing by the administrative division in charge of the room, so that the room IC card 4 can be lent to an administrator who uses the room (a professor, a lecturer, etc.) if needed.

The mobile terminal 10 comprises an IC card reading unit 11, a time management unit 12, an information storage unit 13, and an information transmitting unit 14.

The time management unit 12 is provided to acquire the current time. The IC card reading unit 11 reads identifier (ID) information from an IC card. The information storage unit 13 is provided to store the identifier (ID) information read from the IC card as entering/leaving managing information with additional information. The information transmitting unit 14 transmits the entering/leaving managing information stored in the information storage unit 13, to the managing server 20.

It is desirable that the mobile terminal 10 is prepared beforehand through the batch processing by the administrative division so that the mobile terminal 10 can be lent to the administrator who uses the room if needed, similar to the room IC card 4.

The managing server 20 comprises an information receiving unit 21, a basic information storage/management unit 22, and an entering/leaving managing information storage/management unit 23.

The basic information storage/management unit 22 is provided to store and manage user ID information and room ID information in association with the basic information of target users and target rooms (user's name, affiliation, and room's name, location, etc.).

The information receiving unit 21 is provided to receive the entering/leaving managing information transmitted from the mobile terminal 10. The entering/leaving managing information storage/management unit 23 is provided to store and manage the entering/leaving managing information which is received by the information receiving unit 21.

Figure 2:
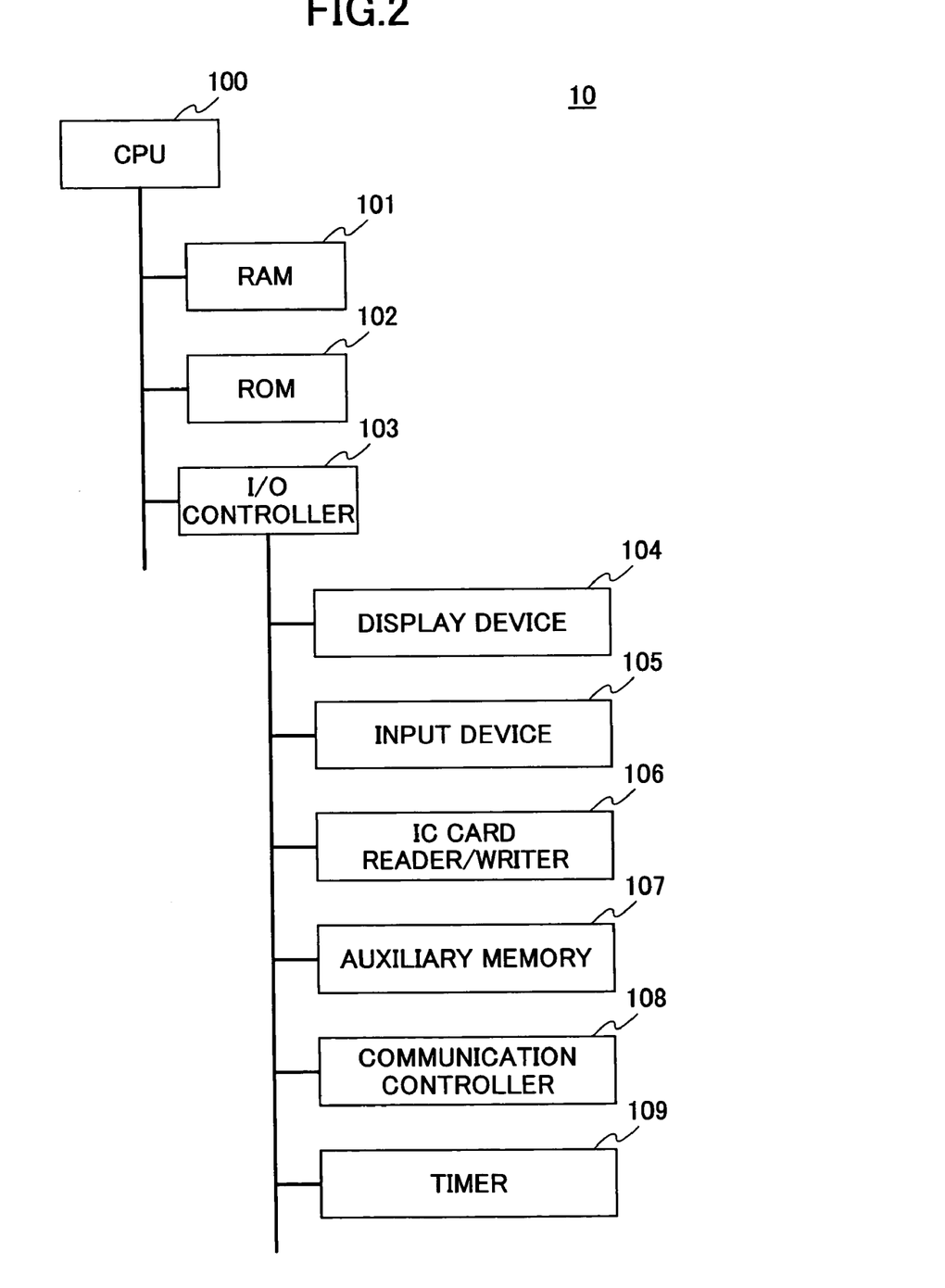
FIG. 2 is a block diagram showing the composition of a mobile terminal in the entering/leaving management system of FIG. 1.

FIG. 2 shows the composition of a mobile terminal in the entering/leaving management system of FIG. 1.

As shown in FIG. 2, the mobile terminal 10 comprises a CPU 100, a RAM 101, a ROM 102, an I/O (input/output) controller 103, a display device 104, an input device 105, an IC card reader/writer 106, an auxiliary memory 107, a communication controller 108, and a timer 109.

In the mobile terminal 10 of FIG. 2, the CPU 100 is a processor which controls the whole system of the mobile terminal 10. When the power supply of the mobile terminal 10 is turned to an ON state, the CPU 100 performs each control action by reading the pre-recorded program from the ROM 102 and loading the program to the RAM 101.

In the mobile terminal 10 of FIG. 2, the CPU 100, the RAM 101, the ROM 102, and the I/O controller 103 are interconnected by a bus.

In the mobile terminal 10 of FIG. 2, the CPU 100 is connected with the respective I/O devices via the bus and the I/O controller 103. For example, a liquid crystal display (LCD) etc. is used for the display device 104. For example, a keyboard and other operational keys are provided in the input device 105. A start key, an end key, etc., associated with the entering/leaving management processing of the invention, are contained in the operational keys of the input device 105.

The IC card reader/writer 106 is provided with a function to read various information items recorded on the IC card, and a function to write various information items to the IC card. The IC card reader/writer 106 may be of contact type which reads and writes information by bringing the IC card reader/writer 106 into contact with the IC card, or may be of non-contact type which reads and writes information without contacting the IC card.

The above-mentioned IC card reading unit 11 is constituted by the CPU 100 and the IC card reader/writer 106.

For example, a semiconductor memory card, etc. is used for the auxiliary memory 107. The above-mentioned information storage unit 13 is constituted by the CPU 100 and the auxiliary memory 107. The auxiliary memory 107 is provided with a function which records the managing information which is processed with the mobile terminal 10.

For example, a LAN card, a modem, etc. are used for the communication controller 108. The above-mentioned information transmitting unit 14 is constituted by the CPU 100 and the communication controller 108.

The timer 109 is used for the time management, the timer control, etc. in the mobile terminal 10. The above-mentioned time management unit 12 is constituted by the CPU 100 and the timer 109.

Next, the entering/leaving management processing which is performed by the entering/leaving management system in the embodiment of FIG. 1 will be explained.

Figure 3:
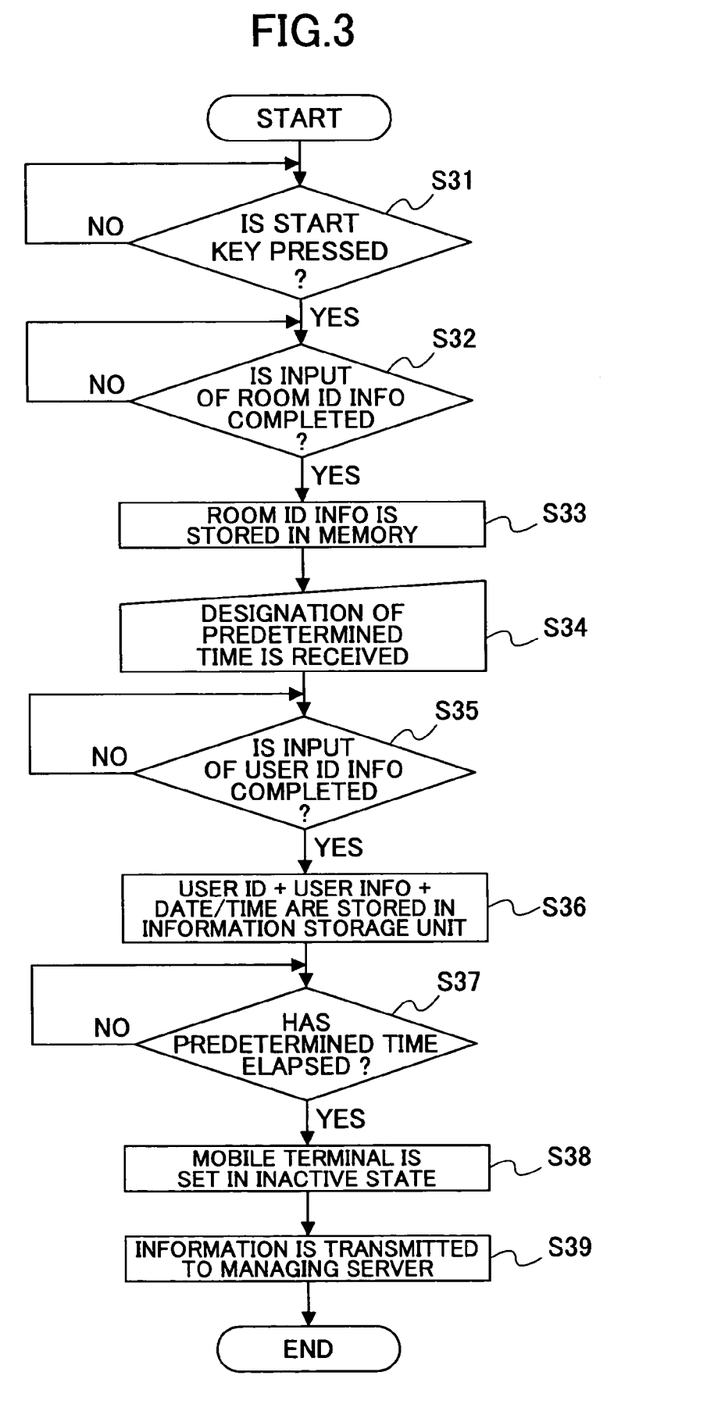
FIG. 3 is a flowchart for explaining an entering/leaving management processing which is performed by the mobile terminal in the entering/leaving management system of FIG. 1.

FIG. 3 is a flowchart for explaining the entering/leaving management processing which is performed by the mobile terminal 10 in the entering/leaving management system of FIG. 1.

When the power switch of the mobile terminal 10 is turned ON, the CPU 100 starts the entering/leaving management processing of FIG. 3 by reading the pre-recorded program from the ROM 102 and loading the program to the RAM 101.

Upon start of the entering/leaving management processing of FIG. 3, the CPU 100 determines whether the start key of the mobile terminal 10 is pressed (step S31).

If the start key is pressed, the CPU 100 determines whether the input of room identifier (ID) information by reading the room IC card 4 is completed (step S32).

If the input of the room identifier (ID) information is completed, the CPU 100 stores the room identifier (ID) information 13a into the information storage unit 13 (step S33).

If step S33 is completed, the CPU 100 receives designation of a predetermined time or designation of a predetermined period (e.g., the time the attendance check of the users of the lecture concerned is finished) which is inputted from the input device 105 by the administrator who uses the room (step S34).

If step S34 is completed, the CPU 100 determines whether the reading (input) of all the user identifier information from respective user IC cards 2 using the IC card reading unit 11 is completed (step S35). At this step S35, execution of the reading processing of user identifier information is repeated for every user IC card 2 of the users who are going to enter the room.

When it is determined at step S35 that all the inputs of user identifier information are completed, the CPU 100 adds the room identifier information 13a already stored in the information storage unit 13 and the time information (date/time) acquired by the time management unit 12, to the user identifier information read from each of the user IC cards 2, and stores the resulting information into the information storage unit 13 as entering/leaving managing information 13b (step S36).

If step S36 is completed, the CPU 100 determines whether the designated time received at step S34 has elapsed, by using the time management unit 12 (step S37). Alternatively, this step S37 may be configured so that the CPU 100 determines whether the end key of the mobile terminal 10 is pressed.

If it is determined at step S37 that the designated time has elapsed, the CPU 100 sets the mobile terminal 10 in an inactive state so that the user IC card 2 can no longer be read out (step S38).

If step S38 is completed, the CPU 100 transmits the entering/leaving managing information 13b stored in the information storage unit 13, to the managing server 20 by using the information transmitting unit 14 (step S39).

If step S39 is completed, the entering/leaving management processing on the side of the mobile terminal 10 is terminated.

Figure 4:
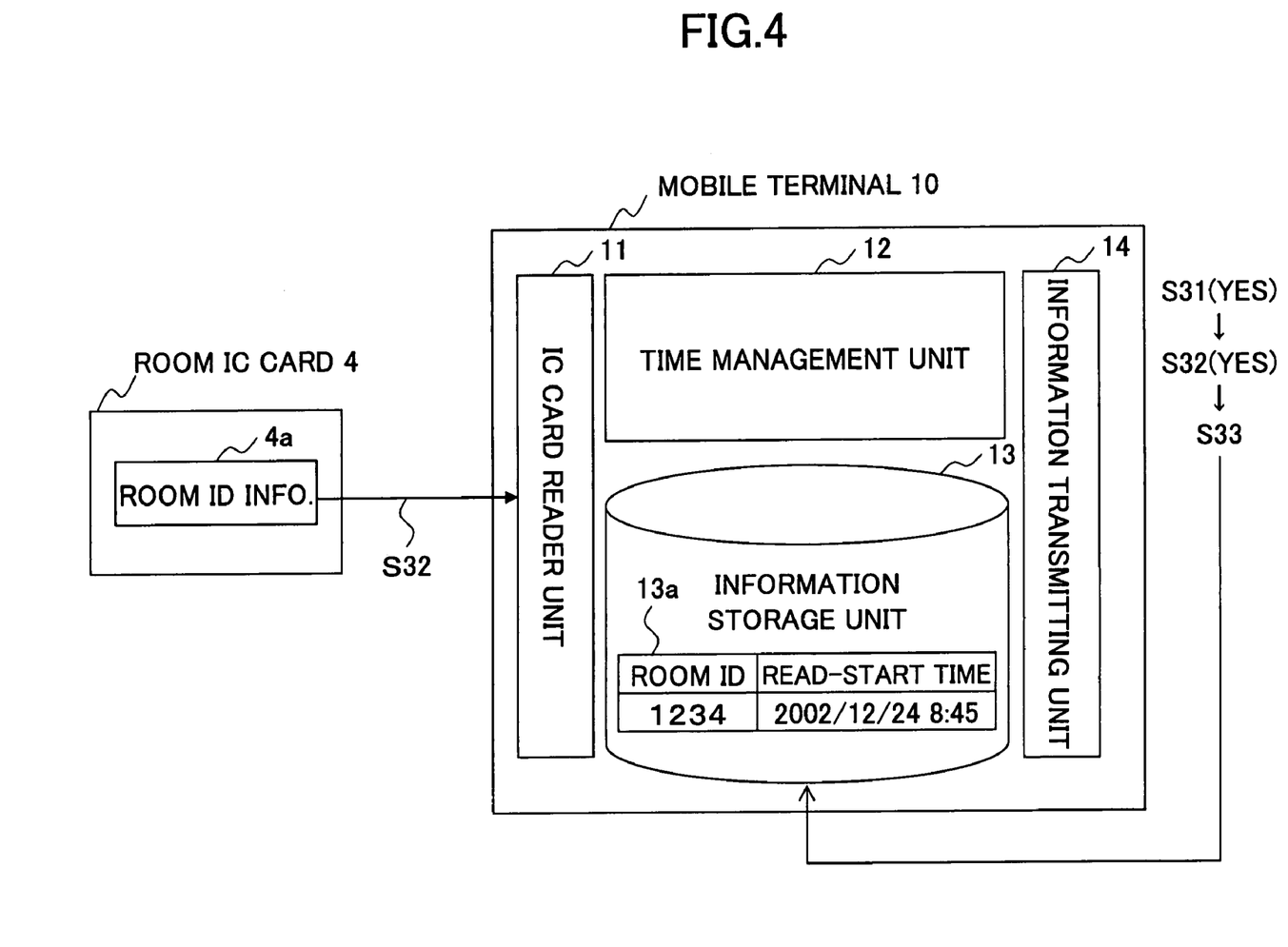
FIG. 4 is a diagram for explaining the reading procedure and the storing procedure to read room identifier information from a room IC card and store the same in the entering/leaving management processing of FIG. 3.

FIG. 4 is a diagram for explaining the reading procedure (S32) to read the room identifier information from the room IC card, and the storing procedure (S33) to store the same in the entering/leaving management processing of FIG. 3.

When using a specific room, the administrator who uses the room borrows a room IC card 4 and a mobile terminal 10 from the administrative division. After arriving at the room, the administrator presses the start key of the mobile terminal 10 and makes the room IC card 4 read, in order to set the mobile terminal 10 in an active state so that a user IC card 2 can be read out.

At this time, the time information acquired by the time management unit 12 is added to the room identifier (ID) information 4a read from the room IC card 4, and the resulting information is stored into the information storage unit 13 in the mobile terminal 10 as the room identifier information 13a.

Alternatively, the mobile terminal 10 may be configured so that the input device is provided with an operation/selection unit which allows each user to choose one of the operation at the time of entering the room and the operation at the time of leaving the room. Using this operation selection unit, each user chooses either the operation at the time of entering the room or the operation at the time of leaving the room, and performs the reading operation of the user IC card 2 by using the IC card reading unit 11 twice for the time of entering the room and the time of leaving the room.

Figure 5:
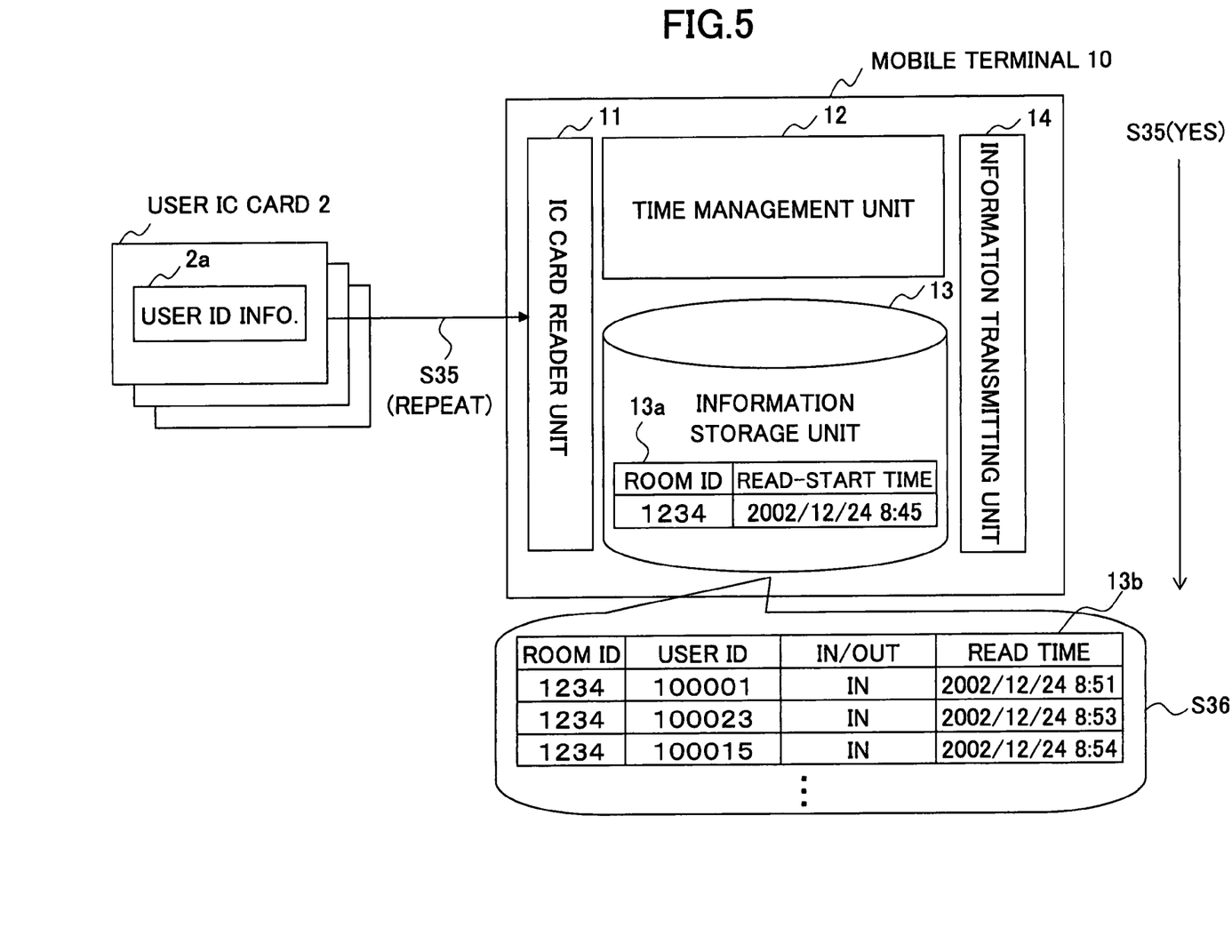
FIG. 5 is a diagram for explaining the reading procedure and the storing procedure to read user identifier information from a user IC card and store entering/leaving managing information in the entering/leaving management processing of FIG. 3.

Next, FIG. 5 is a diagram for explaining the reading procedure (S35) to read the user identifier information from the user IC card, and the storing procedure (S36) to store the entering/leaving managing information in entering/leaving management processing of FIG. 3.

As shown in FIG. 5, the administrator instructs each user who is going to enter the room to perform the reading operation of the user identifier (ID) information in the user IC card 2 on the mobile terminal 10.

The room identifier information 13a stored in the information storage unit 13 and the time information acquired by the time management unit 12 are added to the user identifier information 2a read from the user IC card 2 by performing the reading operation, so that the resulting information is stored into the information storage unit 13 in the mobile terminal 10 as the entering/leaving managing information 13b.

In order to realize the judgment of the entering/leaving authority for every user with good accuracy, the mobile terminal 10 may be configured so that judgment of whether the user biometric information matches the pre-recorded user identity information is performed additionally when each user performs the reading of the user identifier information from the user IC card 2.

In order to perform this additional judgment, it is necessary that the user biometric information, such as the fingerprint, the voiceprint, the iris, the vein pattern, etc. for identifying the user is recorded beforehand on the user IC card 2, in addition to the above-mentioned user identifier information. Moreover, it is necessary to provide a biometric information collection unit, such as a fingerprint reader, in the mobile terminal 10, and provide a user biometric information matching unit in the mobile terminal 10 or the user IC card 2.

In this case, simultaneously when the user IC card 2 is read using the IC card reading unit 11, the user biometric information, such as the fingerprint, is also collected from the user using the biometric information collection unit. Using the user biometric information matching unit, it is determined whether the user biometric information collected from the user with the user biometric information collection unit of the mobile terminal 10 matches with the user biometric information pre-recorded in the user IC card 2. Only when a match occurs, the reading of the user identifier information from the user IC card 2 is permitted.

As described above, after acquiring the entering/leaving managing information of all the users who are going to enter the room, the administrator performs the operation on the mobile terminal 10, such as depression of the end key of the mobile terminal 10, to set the mobile terminal 10 is in the inactive state so that the user IC card 2 can no longer be read out.

Alternatively, the mobile terminal 10 may be configured so that the reading processing of user identifier information is automatically finished (S37 and S38 of FIG. 3) when a finish time set up by the administrator is reached or when a predetermined period of time from the start time of the reading processing of the user identifier information has elapsed, instead of the operation of the depression of the end key by the administrator.

Figure 6:
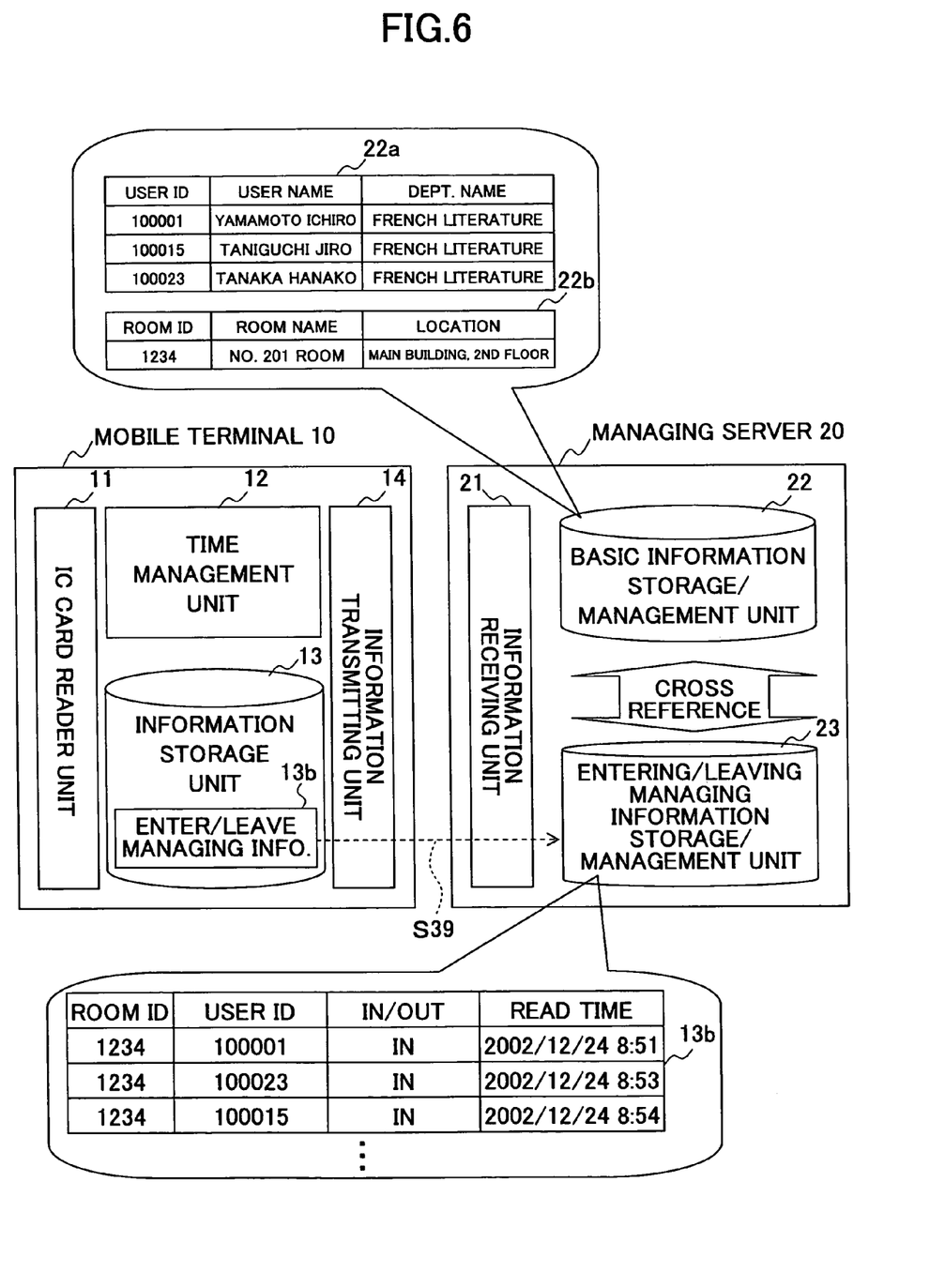
FIG. 6 is a diagram for explaining the transmission procedure to transmit the entering/leaving managing information to a managing server in the entering/leaving management processing of FIG. 3, and the entering/leaving management processing for every user with the managing server.

FIG. 6 is a diagram for explaining the transmission procedure (S39) to transmit the entering/leaving managing information to the managing server in the entering/leaving management processing of FIG. 3, and the entering/leaving management processing for every user with the managing server 20.

After the use of the room is completed, the administrator transmits the entering/leaving managing information 13b stored in the information storage unit 13 of the mobile terminal 10, to the managing server 20 by using the information transmitting unit 14 (S39 in FIG. 3).

After the transmission of the entering/leaving managing information is completed, the administrator returns the room IC card 4 and the mobile terminal 10 to the administrative division.

The managing server 20 receives the entering/leaving managing information 13b from the mobile terminal 10 by using the information receiving unit 21, and stores the received information into entering/leaving managing information storage/management unit 23.

In this way, at the managing server 20, the entering/leaving managing information 13b stored in the entering/leaving managing information storage/management unit 23 of the managing server 20 is cross-referenced with the user basic information 22a and the room basic information 22b stored in the basic information storage/management unit 22 of the managing server 20. Thereby, the managing server 20 can manage the entering/leaving managing information 13b which indicates which user entered or left the room, which room the user entered or left, and when the user entered or left the room.

According to the entering/leaving management system of the above-mentioned embodiment, a special installation work for installing the device is unnecessary, and it is possible to easily introduce the entering/leaving management system with low cost when compared with the case of the conventional system.

Figure 7:
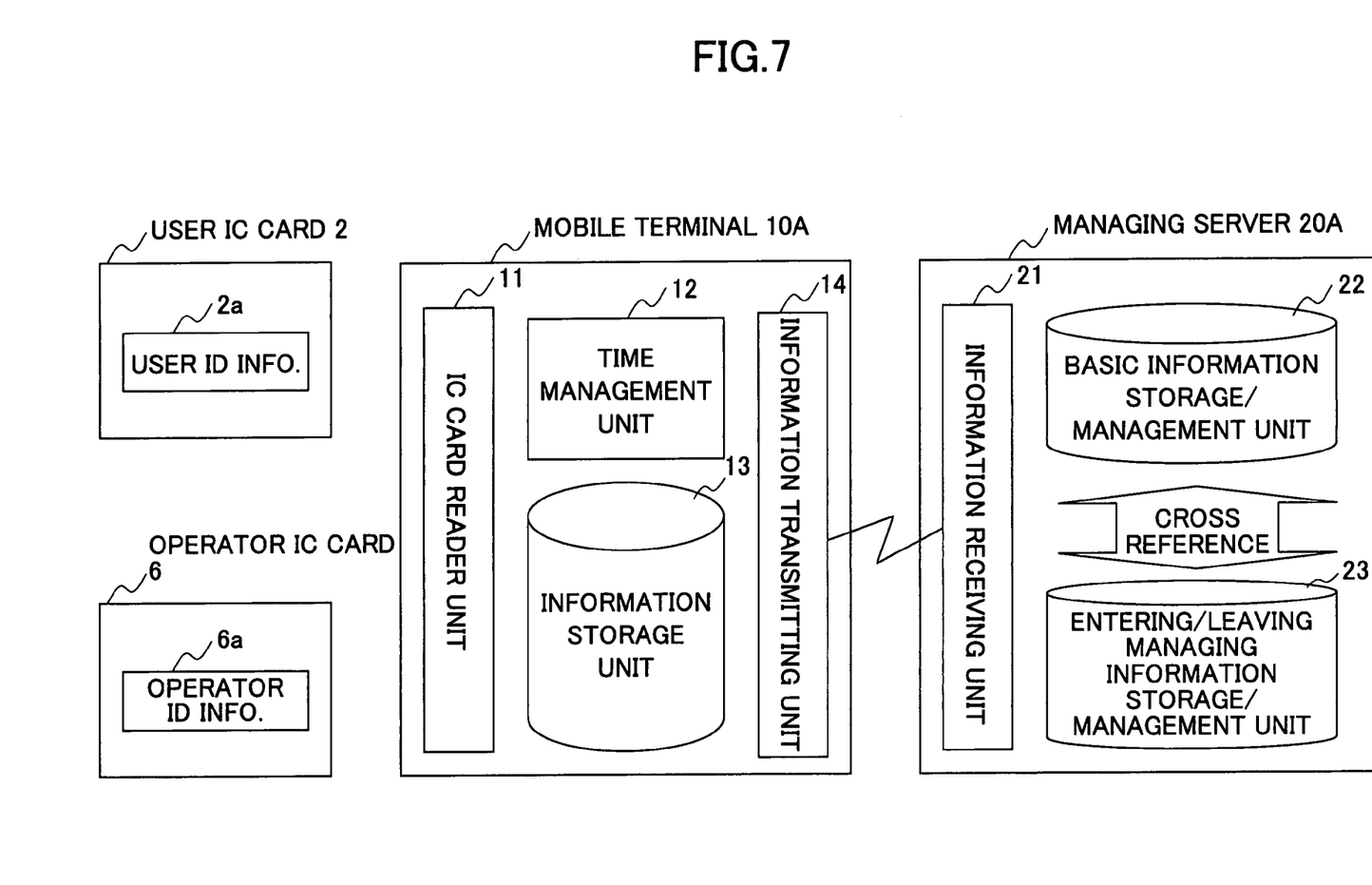
FIG. 7 is a block diagram showing the composition of an entering/leaving management system in another embodiment of the invention.

Next, FIG. 7 shows the composition of an entering/leaving management system in another embodiment of the invention.

As shown in FIG. 7, the entering/leaving management system of this embodiment comprises a user IC card 2, an operator IC card 6, a mobile terminal 10A, and a managing server 20A.

In FIG. 7, the elements which are essentially the same as corresponding elements in FIG. 1 are designated by the same reference numerals, and a description thereof will be omitted.

The user IC card 2 is an IC card on which user identifier (ID) information 2a that identifies each individual who is a user (a student, an employee, etc.) is recorded similar to the embodiment of FIG. 1. The user IC card 2 is usually carried by the user (or each individual).

The operator IC card 6 is an IC card on which operator identifier (ID) information 6a that identifies each operator (an operator a lecturer, etc. who collects the user's entering/leaving managing information using the mobile terminal) is recorded. The operator IC card 6 is usually carried by the operator (or each individual).

The mobile terminal 10A in this embodiment is the same as that of the embodiment of FIG. 1. Namely, the mobile terminal 10A comprises an IC card reading unit 11, a time management unit 12, an information storage unit 13, and an information transmitting unit 14.

The time management unit 12 is provided to acquire the current time. The IC card reading unit 11 reads identifier (ID) information from an IC card. The information storage unit 13 is provided to store the identifier (ID) information read from the IC card as entering/leaving managing information with additional information. The information transmitting unit 14 transmits the entering/leaving managing information stored in the information storage unit 13, to a managing server 20A. The mobile terminal 10A in this embodiment has the composition that is the same as that in the embodiment of FIG. 2.

It is desirable that the mobile terminal 10A is prepared beforehand through the batch management by the administrative division so that the mobile terminal 10A can be lent to the operator who uses the room, if needed.

Similar to the embodiment of FIG. 1, the managing server 20A comprises an information receiving unit 21, a basic information storage/management unit 22, and an entering/leaving managing information storage/management unit 23.

The basic information storage/management unit 22 is provided to store and manage user ID information and operator ID information in association with the basic information of target users and target operators (user's name, affiliation, and operator's name, weekly or hourly lectures in change, classrooms, etc.).

The information receiving unit 21 is provided to receive the entering/leaving managing information transmitted from the mobile terminal 10A. The entering/leaving managing information storage/management unit 23 is provided to store and manage the entering/leaving managing information which is received by the information receiving unit 21.

Next, the entering/leaving management processing which is performed by the entering/leaving management system in the embodiment of FIG. 7 will be explained.

Figure 8:
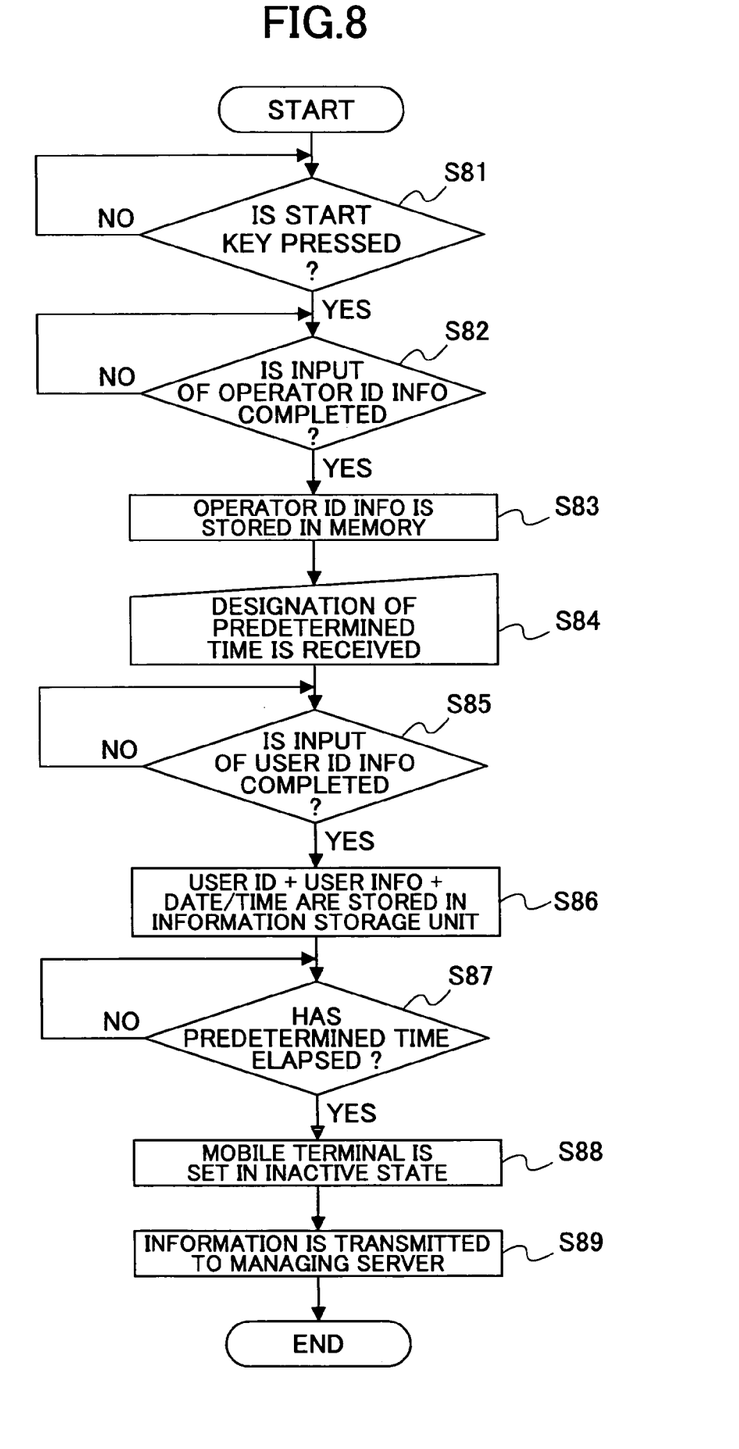
FIG. 8 is a flowchart for explaining an entering/leaving management processing which is performed by the mobile terminal in the entering/leaving management system of FIG. 7.

FIG. 8 is a flowchart for explaining the entering/leaving management processing which is performed by the mobile terminal 10A in the entering/leaving management system of the embodiment of FIG. 7.

When the power switch of the mobile terminal 10A is turned ON, the CPU 100 starts the entering/leaving management processing of FIG. 8 by reading the pre-recorded program from the ROM 102 and loading the program to the RAM 101.

Upon start of the entering/leaving management processing of FIG. 8, the CPU 100 determines whether the start key of the mobile terminal 10A is pressed (step S81).

If the start key is pressed, the CPU 100 determines whether the input of operator identifier (ID) information by reading the operator IC card 6 is completed (step S82).

If the input of the operator identifier (ID) information is completed, the CPU 100 stores the operator identifier (ID) information 13c into the information storage unit 13 (step S83).

If step S83 is completed, the CPU 100 receives designation of a predetermined time or designation of a predetermined period (e.g., the time the attendance check of the users of the lecture concerned is finished) which is inputted from the input device 105 by the administrator (operator) who uses the room (step S84).

If step S84 is completed, the CPU 100 determines whether the reading (input) of all the user identifier information from respective user IC cards 2 using the IC card reading unit 11 is completed (step S85). At this step S85, execution of the reading processing of user identifier information is repeated for every user IC card 2 of the users who are going to enter the room.

When it is determined at step S85 that all the inputs of user identifier information are completed, the CPU 100 adds the operator identifier information 13c, already stored in the information storage unit 13, and the time information (date/time) acquired by the time management unit 12, to the user identifier information read from the user IC card 2, and stores the resulting information into the information storage unit 13 as entering/leaving managing information 13d (step S86).

If step S86 is completed, the CPU 100 determines whether the designated time received at step S84 has elapsed, by using the time management unit 12 (step S87). Alternatively, this step S87 may be configured so that the CPU 100 determines whether the end key of the mobile terminal 10A is pressed.

If it is determined at step S87 that the designated time has elapsed, the CPU 100 will set the mobile terminal 10A in an inactive state so that the user IC card 2 can no longer read out (step S88).

If step S88 is completed, the CPU 100 transmits the entering/leaving managing information 13d stored in the information storage unit 13, to the managing server 20A by using the information transmitting unit 14 (step S89).

If step S89 is completed, the entering/leaving management processing on the side of the mobile terminal 10A is terminated.

Figure 9:
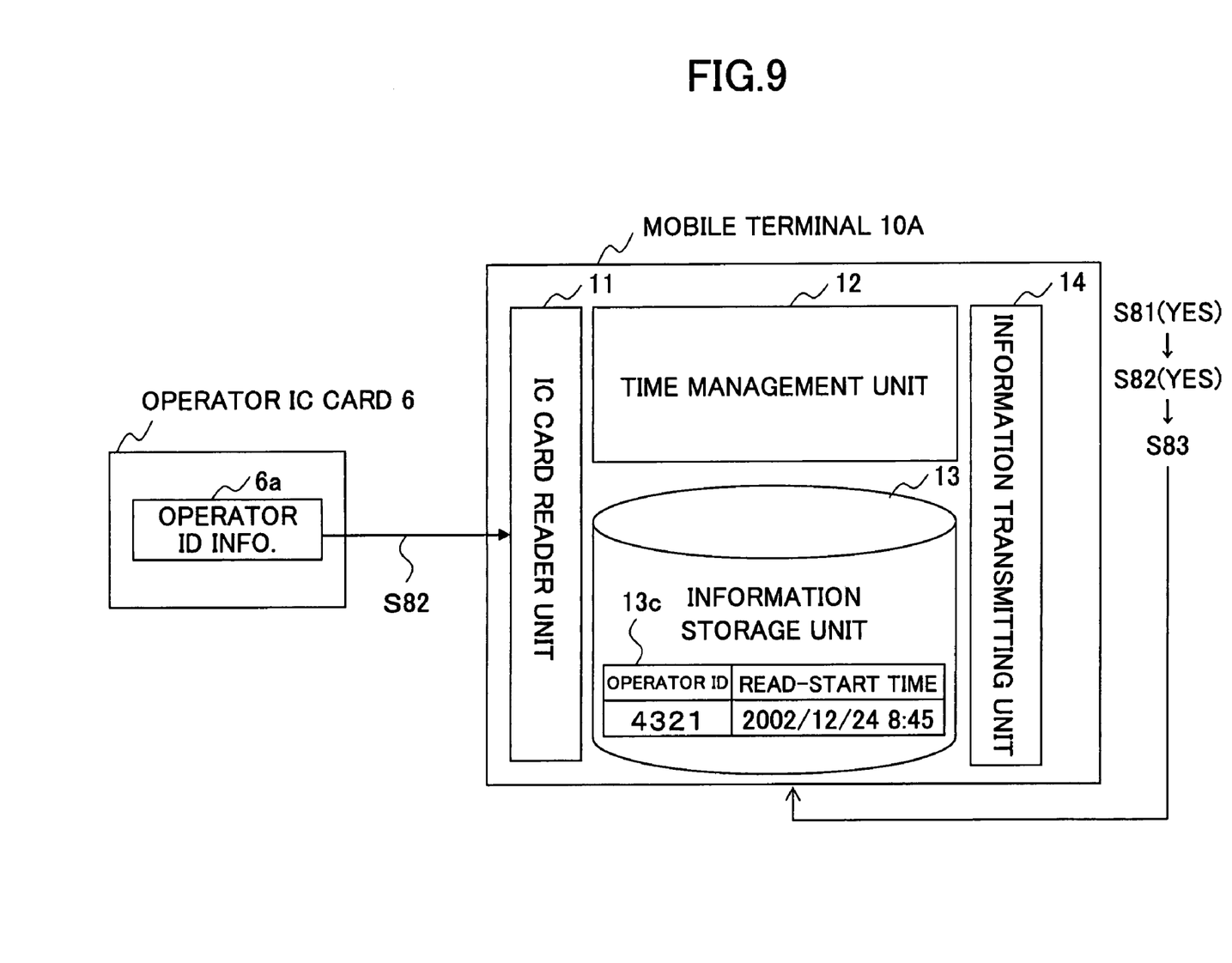
FIG. 9 is a diagram for explaining the reading procedure and the storing procedure to read operator identifier information from an operator IC card and store operator identifier information in the entering/leaving management processing of FIG. 8.

FIG. 9 is a diagram for explaining the reading procedure (S82) to read the operator identifier information from the operator IC card, and the storing procedure (S83) to store the same in the entering/leaving management processing of FIG. 8.

When giving a specific lecture, the operator (or the administrator) borrows the mobile terminal 10A from the administrative division. After arriving at the target classroom (room), the operator presses the start key of the mobile terminal 10A and makes the operator IC card 6 read, in order to set the mobile terminal 10A in an active state so that a user IC card 2 can be read out.

At this time, the time information acquired by the time management unit 12 is added to the operator identifier (ID) information 6a read from the operator IC card 6, and the resulting information is stored into the information storage unit 13 in the mobile terminal 10A as the operator identifier information 13c.

Alternatively, the mobile terminal 10A may be configured so that the input device 105 is provided with an operation selection unit which allows each user to choose one of the operation at the time of entering the room and the operation at the time of leaving the room. Using this operation selection unit of the input device 105 of the mobile terminal 10A, each user chooses either the operation at the time of entering the room or the operation at the time of leaving the room, and performs the reading operation of the user IC card 2 by using the IC card reading unit 11 twice at the time of entering the room and at the time of leaving the room.

Figure 10:
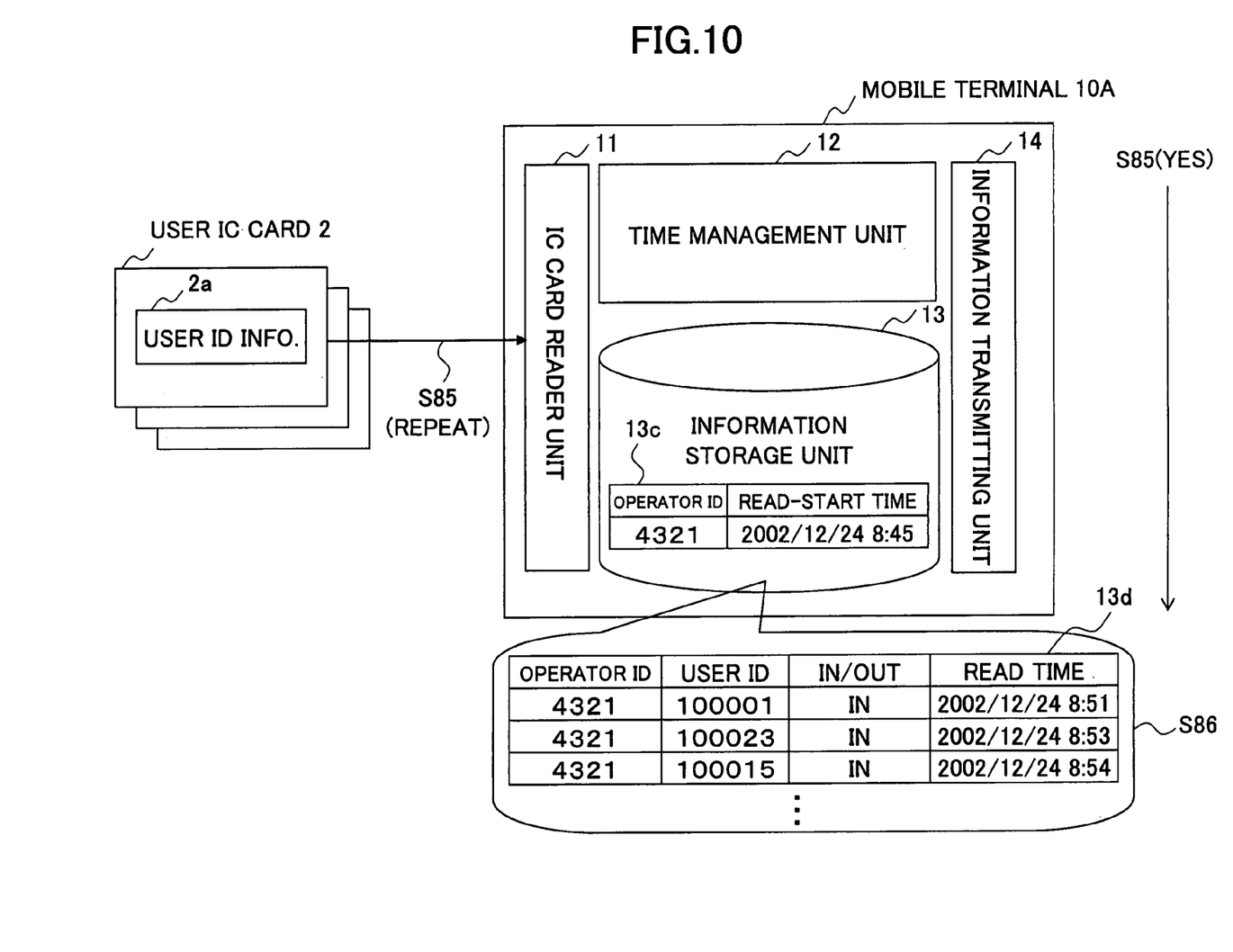
FIG. 10 is a diagram for explaining the reading procedure and the storing procedure to read user identifier information from a user IC card and store entering/leaving managing information in the entering/leaving management processing of FIG. 8.

Next, FIG. 10 is a diagram for explaining the reading procedure (S85) to read the user identifier information from the user IC card, and the storing procedure (S86) to store the entering/leaving managing information in the entering/leaving management processing of FIG. 8.

As shown in FIG. 10, the operator instructs each user who is going to enter the classroom (room) to perform the reading operation of the user identifier (ID) information in the user IC card 2 on the mobile terminal 10A.

The operator identifier information 13c stored in the information storage unit 13 and the time information acquired by the time management unit 12 are added to the user identifier (ID) information 2a read from the user IC card 2 by performing the reading operation, so that the resulting information is stored into the information storage unit 13 in the mobile terminal 10A as the entering/leaving managing information 13d.

In order to realize the judgment of the entering/leaving authority for every user with good accuracy, the mobile terminal 10A may be configured so that the judgment of whether the user biometric information matches the pre-recorded user identity information is performed additionally when each user performs the reading of the user identifier information from the user IC card 2.

In order to perform this additional judgment, it is necessary that the user biometric information, such as the fingerprint, the voiceprint, the iris, the vein pattern, etc. for identifying the user is recorded beforehand on the user IC card 2, in addition to the above-mentioned user identifier information. Moreover, it is necessary to provide a biometric information collection unit, such as a fingerprint reader, in the mobile terminal 10A, and provide a user biometric information matching unit in the mobile terminal 10A or the user IC card 2.

In this case, simultaneously when the user IC card 2 is read using the IC card reading unit 11, the user biometric information, such as the fingerprint, is also collected from the user using the biometric information collection unit. Using the user biometric information matching unit, it is determined whether the user biometric information collected from the user with the user biometric information collection unit of the mobile terminal 10A matches with the user biometric information pre-recorded in the user IC card 2. Only when a match occurs, the reading of the user identifier information 2a from the user IC card 2 is permitted.

As described above, after acquiring the entering/leaving managing information of all the users who are going to enter the room, the operator performs the operation on the mobile terminal 10A, such as depression of the end key of the mobile terminal 10A, in order to set the mobile terminal 10A in the inactive state so that the user IC card 2 can no longer be read out.

Alternatively, the mobile terminal 10A may be configured so that the reading processing of the user identifier information 2a is automatically finished (S87 and S88 of FIG. 8) when a finish time set up by the operator is reached or when a predetermined period of time from the start time of the reading processing of the user identifier information has elapsed, instead of the operation of the depression of the end key by the operator.

Figure 11:
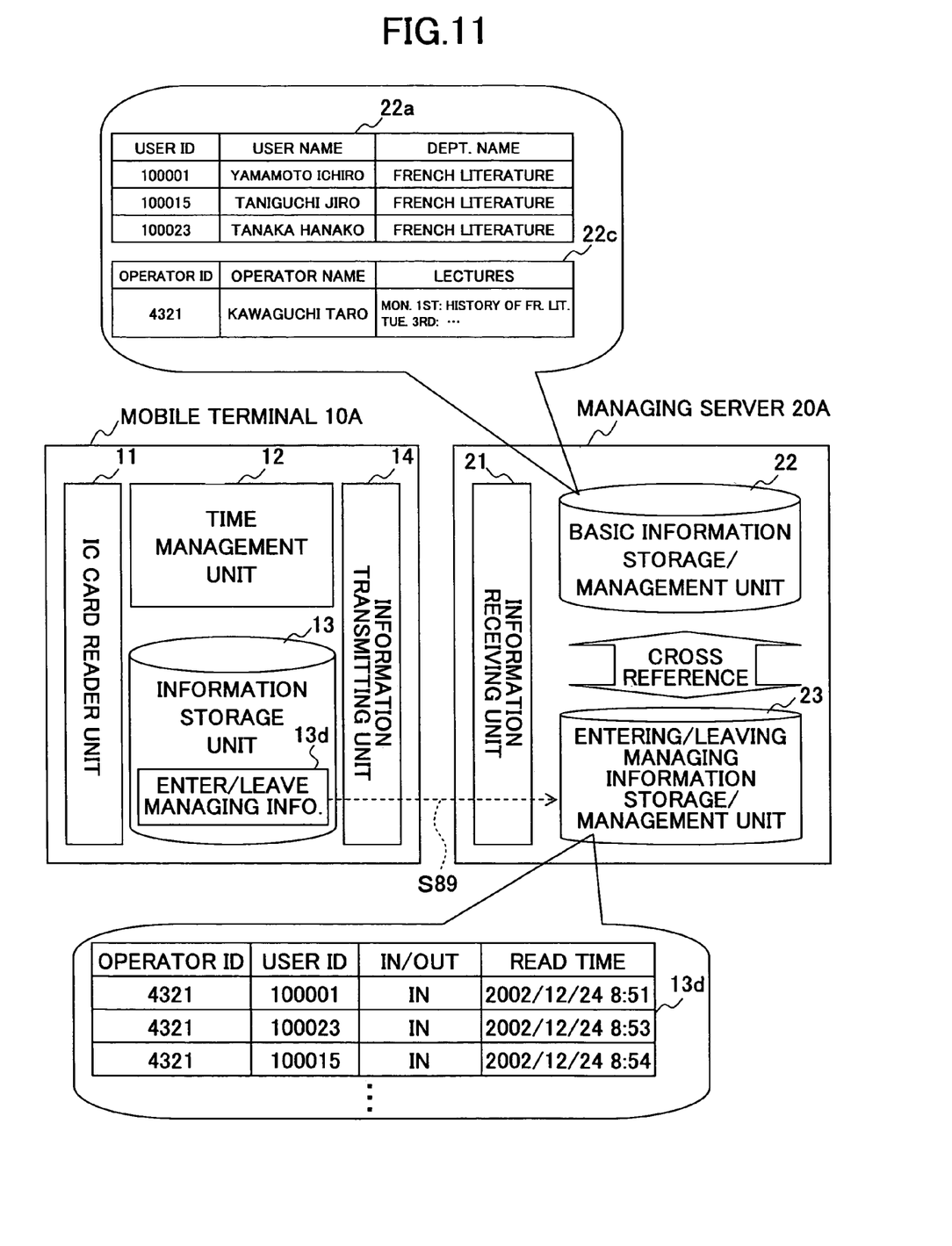
FIG. 11 is a diagram for explaining the transmission procedure to transmit the entering/leaving managing information to the managing server in the entering/leaving management processing of FIG. 8, and the entering/leaving management processing for every user with the managing server.

FIG. 11 is a diagram for explaining the transmission procedure (S89) to transmit the entering/leaving managing information to the managing server in the entering/leaving management processing of FIG. 8, and the entering/leaving management processing for every user with the managing server.

After the lecture in the room is completed, the operator transmits the entering/leaving managing information 13d stored in the information storage unit 13 of the mobile terminal 10A, to the managing server 20A, by using the information transmitting unit 14 (S89 in FIG. 8).

After the transmission of the entering/leaving managing information 13d is completed, the operator returns the mobile terminal 10A to the administrative division.

The managing server 20A receives the entering/leaving managing information 13d from the mobile terminal 10A by using the information receiving unit 21, and stores the received information into the entering/leaving managing information storage/management unit 23.

In this way, at the managing server 20A, the entering/leaving managing information 13d stored in the entering/leaving managing information storage/management unit 23 is cross-referenced with the user basic information 22a and the operator basic information 22c stored in the basic information storage/management unit 22 of the managing server 20A. Thereby, the managing server 20A can manage the entering/leaving managing information 13d which indicates which user entered or left the lecture (or classroom), which lecture (or classroom) the user entered or left, and when the user entered or left the lecture (or classroom).

According to the entering/leaving management system of the above-mentioned embodiment, a special installation work for installing the device is unnecessary, and it is possible to easily introduce the entering/leaving management system with low cost when compared with the case of the conventional system.

The present invention is not limited to the above-described embodiments, and variations and modifications may be made without departing from the scope of the present invention.

What is claimed is:

1. An entering/leaving management system including a user IC card on which user identifier information to identify a specific user is recorded, a room IC card on which room identifier information to identify a specific room is recorded, a mobile terminal provided to access the user IC card and the room IC card, and a managing server, the mobile terminal comprising:

a time management unit provided to acquire a current time;

an IC card reading unit reading the user identifier information from the user IC card and reading the room identifier information from the room IC card;

an information storage unit provided to store the user identifier information read from the user IC card together with additional information as entering/leaving managing information; and an information transmitting unit transmitting the entering/leaving managing information stored in the information storage unit, to the managing server, wherein the IC card reading unit reads the room identifier information from the room IC card to initialize the IC card reading unit as to location, wherein the mobile terminal adds the time information acquired by the time management unit and the room identifier information to the user identifier information read from the user IC card by the IC card reading unit, so that the resulting information is stored into the information storage unit as the entering/leaving managing information, wherein, after reading of all user IC cards is completed, the mobile terminal transmits the entering/leaving managing information stored in the information storage unit, to the managing server by using the information transmitting unit, and the entering/leaving managing information is stored in the managing server, and wherein the managing server manages times of arrival and departure of the user through cross reference of the stored entering/leaving managing information with user basic information and room basic information.

2. The system according to claim 1 wherein, the IC card reading unit of the mobile terminal reads the room identifier information only once.

3. The system according to claim 1 wherein the mobile terminal is provided with an operation selection unit which allows the user to choose one of an operation at a time of entering the room and an operation at a time of leaving the room, reading operation of the user IC card using the IC card reading unit of the mobile terminal twice at the time of entering the room and at the time of leaving the room in response to a user choosing the operation.

4. The system according to claim 1 wherein the user IC card has user biometric information recorded as information for identifying the user, in addition to the user identifier information, wherein the mobile terminal comprises a biometric information collection unit collecting user biometric information from the user, and wherein one of the user IC card and the mobile terminal comprises a biometric information matching unit determining whether the user biometric information collected from the user by the biometric information collection unit matches the user biometric information recorded on the user IC card.

5. An entering/leaving management system including a user IC card on which user identifier information to identify a specific user is recorded, an operator IC card on which operator identifier information to identify a specific operator is recorded, a mobile terminal provided to access the user IC card and the operator IC card, and a managing server, the mobile terminal comprising:

a time management unit provided to acquire a current time;

an IC card reading unit reading the user identifier information from the user IC card and reading the operator identifier information from the operator IC card;

an information storage unit provided to store the user identifier information read from the user IC card together with additional information as entering/leaving managing information; and an information transmitting unit transmitting the entering/leaving managing information stored in the information storage unit, to the managing server, wherein the IC card reading unit reads the operator identifier information from the operator IC card so as to initialize the IC card reading unit with the operator identifier information, wherein the mobile terminal adds the time information acquired by the time management unit and the operator identifier information to the user identifier information read from the user IC card by the IC card reading unit, so that the resulting information is stored into the information storage unit as the entering/leaving managing information, wherein, after reading of all user IC cards is completed, the mobile terminal transmits the entering/leaving managing information stored in the information storage unit, to the managing server by using the information transmitting unit, and the entering/leaving managing information is stored in the managing server, and wherein the managing server manages times of arrival and departure of the user through cross reference of the stored entering/leaving managing information with user basic information and operator basic information.

6. The system according to claim 5 wherein, the IC card reading unit of the mobile terminal reads the operator identifier information only once.

7. The system according to claim 5 wherein the mobile terminal is provided with an operation selection unit which allows the user to choose one of an operation at a time of entering the room and an operation at a time of leaving the room, operation of the user IC card using the IC card reading unit of the mobile terminal twice at the time of entering the room and at the time of leaving the room in response to a user choosing the operation.

8. The system according to claim 5 wherein the user IC card has user biometric information recorded as information for identifying the user, in addition to the user identifier information, wherein the mobile terminal comprises a biometric information collection unit collecting user biometric information from the user, and wherein one of the user IC card and the mobile terminal comprises a biometric information matching unit determining whether the user biometric information collected from the user by the biometric information collection unit matches the user biometric information recorded on the user IC card.

* * * * *